May 5, 1925. 1,536,107
J. R. KLIN
CAN MAKING MACHINERY
Filed May 31, 1923 5 Sheets-Sheet 3
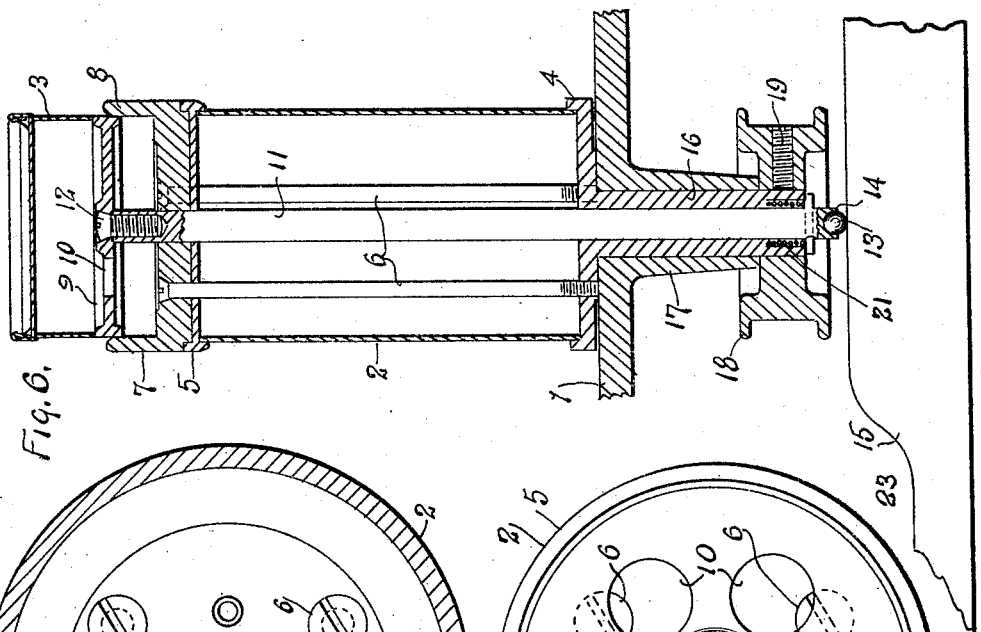
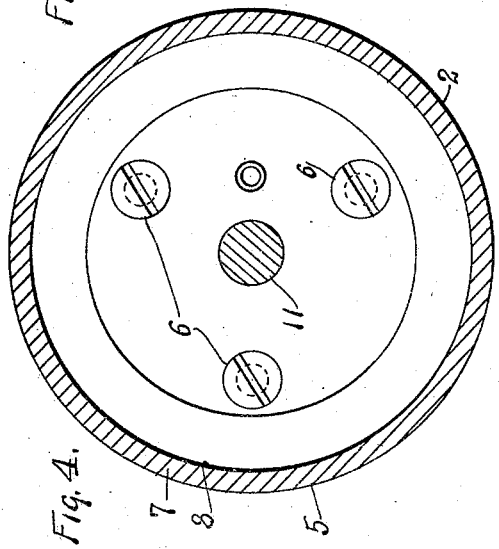
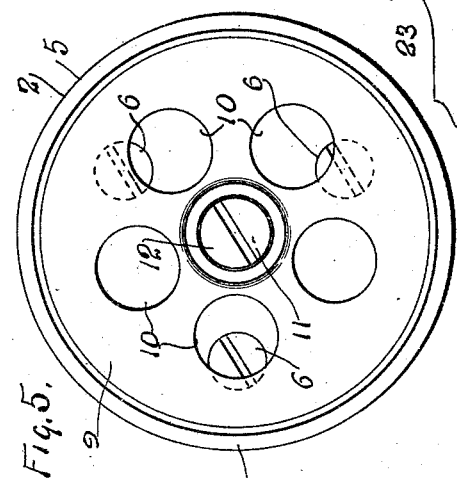
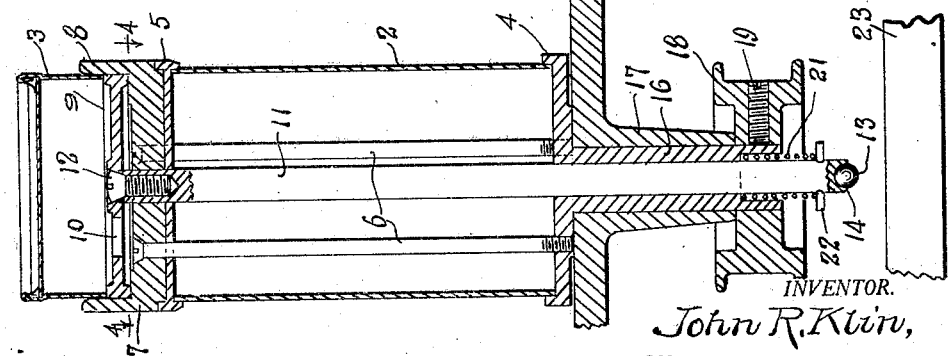
INVENTOR.
John R. Klin,
BY
Toulmin & Toulmin,
ATTORNEYS.

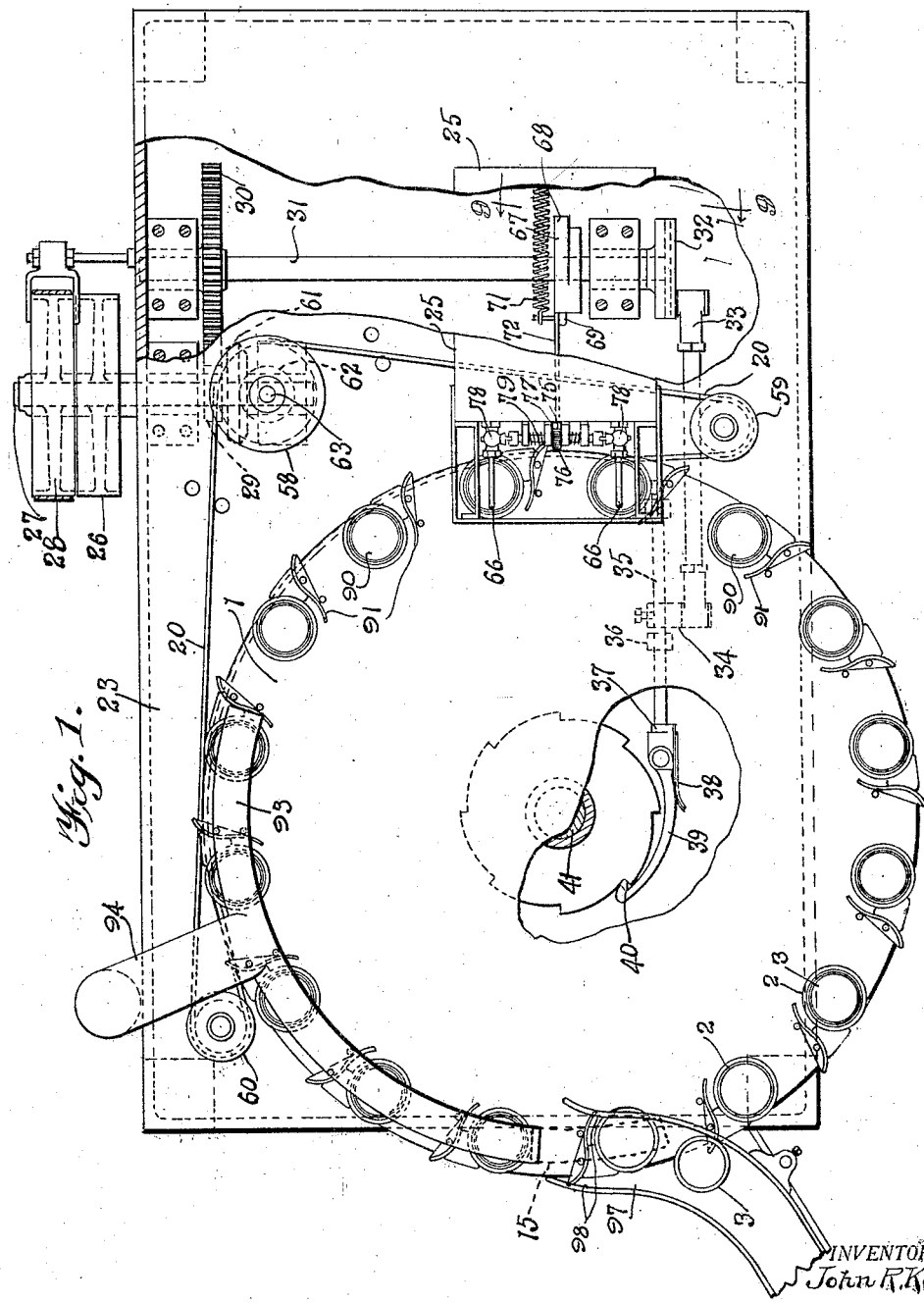

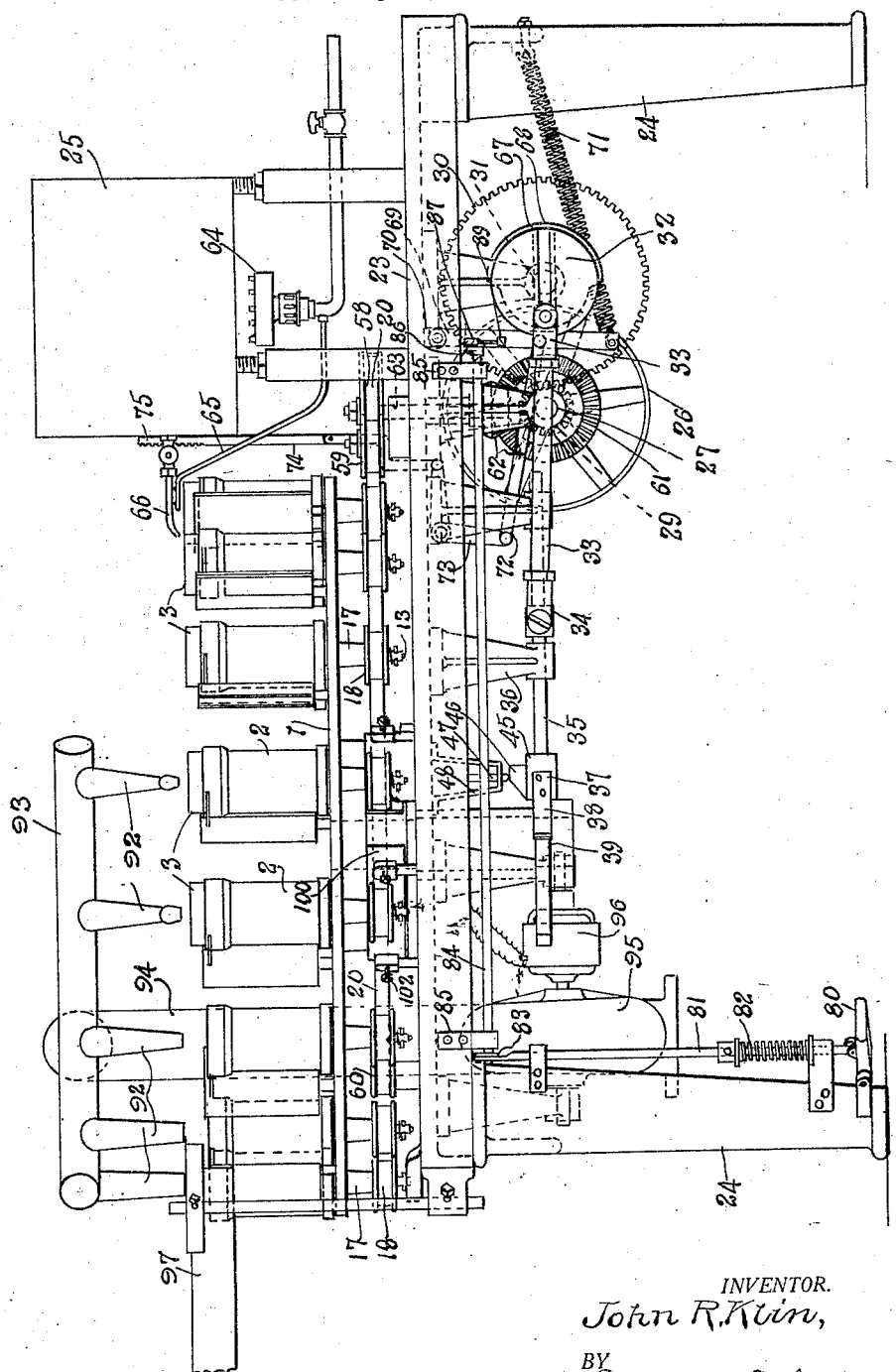

May 5, 1925.  
J. R. KLIN  
1,536,107  
CAN MAKING MACHINERY  
Filed May 31, 1923  
5 Sheets-Sheet 4

INVENTOR.  
John R. Klin,  
BY Toulmin & Toulmin,  
ATTORNEYS.

May 5, 1925.

J. R. KLIN

CAN MAKING MACHINERY

Filed May 31, 1923

INVENTOR.
John R. Klin,
BY Toulmin & Toulmin
ATTORNEYS.

Patented May 5, 1925.

1,536,107

UNITED STATES PATENT OFFICE.

JOHN R. KLIN, OF DAYTON, OHIO, ASSIGNOR, BY MESNE ASSIGNMENTS, TO MENASHA PRINTING AND CARTON CO., OF MENASHA, WISCONSIN, A CORPORATION OF WISCONSIN.

CAN-MAKING MACHINERY.

Application filed May 31, 1923. Serial No. 642,608.

*To all whom it may concern:*

Be it known that I, JOHN R. KLIN, a citizen of the United States, residing at Dayton, in the county of Montgomery and State of Ohio, have invented certain new and useful Improvements in Can-Making Machinery, of which the following is a specification, reference being had therein to the accompanying drawing.

My invention relates to can-making machinery, and, in particular, to the sealing of cans, and a method of sealing them.

It is the object of my invention to provide a machine which will apply a sealing medium, such as paraffin, to a can to seal it.

It is a further object of my invention to provide means of applying a uniform amount of sealing material in a restricted area, cool the sealing material, and eject the can from the machine, so that each can will secure a predetermined amount of sealing material, and will be removed from the machine in finished condition.

It is my object to provide a machine which will handle a large number of cans with a minimum amount of manual handling, so that large quantities of a uniform product may be supplied.

Referring to the drawings:

Figure 1 is a plan view of the machine embodying my invention;

Fig. 2 is a side elevation of the machine;

Fig. 3 is a section through a rotating support, the ejector, and a sample can mounted on the support;

Fig. 4 is a section on the line 4—4 of Fig. 3.

Fig. 5 is a plan view of Fig. 3;

Fig. 6 is a section similar to Fig. 3, showing the ejector in ejecting position;

Figure 7:
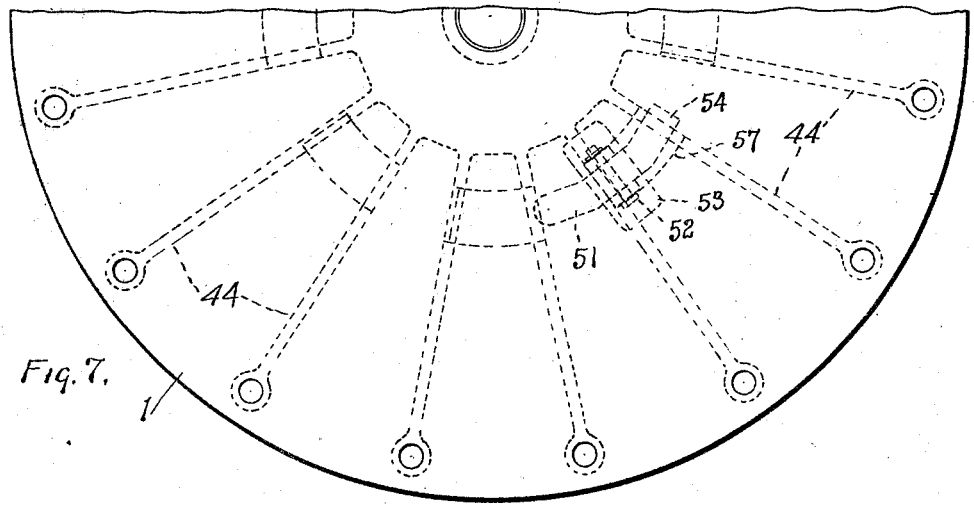
Fig. 7 is a plan view of the supporting table.
Figure 8:
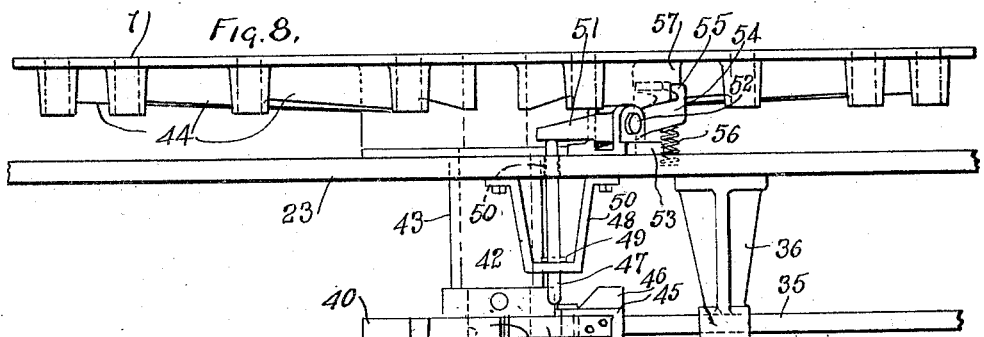
Fig. 8 is a side elevation of the supporting table, the stationary platform, and the locking mechanism for the rotating table.
Figure 9:
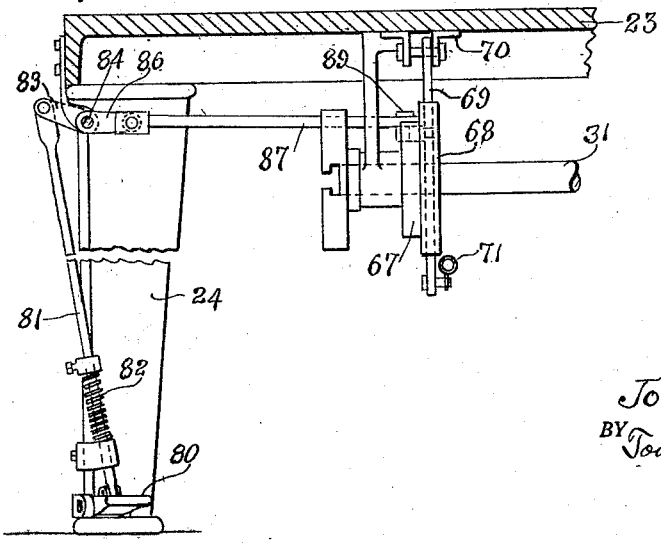
Fig. 9 is a section on the line 9—9 of Fig. 1, showing foot control for the ejection of the sealing medium.
Figure 10:
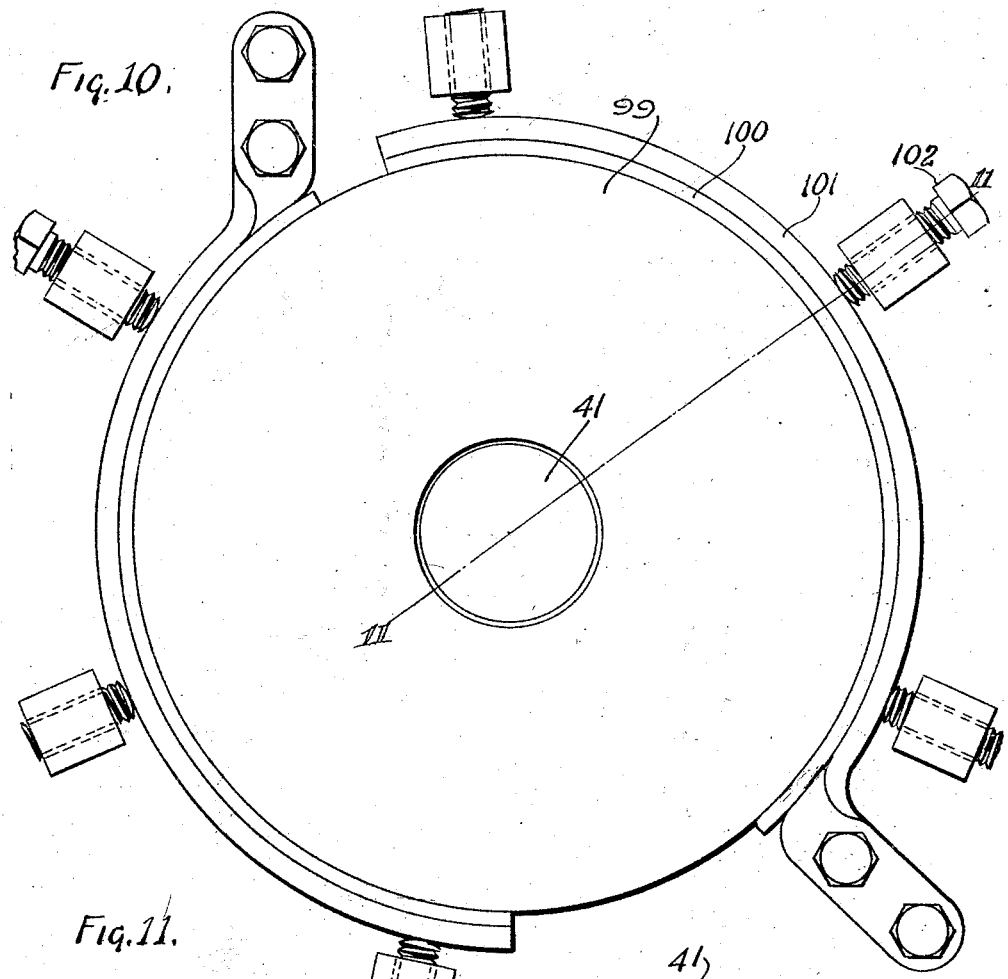
Fig. 10 is a plan view of the brake mechanism for bringing to rest the rotating table.
Figure 11:
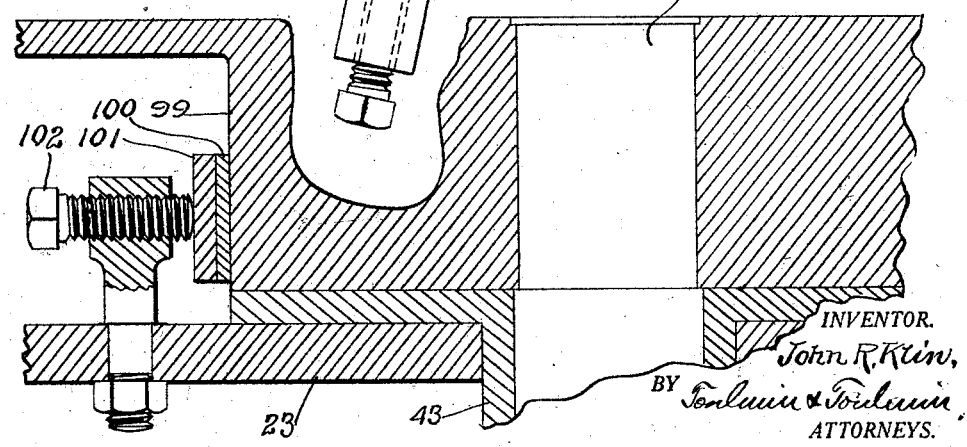
Fig. 11 is a section on the line 11—11 of Fig. 10.

Referring to the drawings in detail:

1 is a rotating table upon which is mounted a plurality of cylindrical supports 2.

These supports have mounted on the top thereof can bodies or caps 3.

The table 1 carries the supports 2 bodily, while the supports 2 rotate upon their own axes at certain periods of their bodily revolution with the rotating table 1.

My mechanism is so arranged that I convey on a suitable carrier the can bodies or caps beneath the apparatus for applying the sealing medium, such as paraffin, at the same time rotating the can bodies to evenly apply and distribute the sealing medium. I then cool the sealing medium while maintaining it in position, due to centrifugal force of the rotating support. When the can or cap is thus completed, I convey it to a point where it is ejected and conveyed away from the machine.

With this broad explanation of the principal features or steps in the process, I will proceed to the details of the invention.

The rotating support consists of the cylinder 2, a bottom 4, and a cap 5, which embrace either end of the cylinder. The cap and bottom are held in their embracing position by rods 6. These rods are connected at one end to the bottom 4, and at the other end to the cap 5. The attachment to the cap 5 is effected by a supporting cap 7, being mounted on the cap 5, and retained thereon by the rod 6, which passes through the supporting cup or cap. The supporting cup 7 has upwardly projecting retaining walls 8 within which the side walls of the can body or cap 3 are located. The bottom of these walls rests upon an ejecting plate 9, so that when this plate is elevated, as in Figure 6, the can or cap may be ejected. This ejecting plate is provided with a plurality of apertures 10. The ejecting plate itself is mounted on an ejecting shaft 11. It is retained thereon by a screw 12.

The bottom of the shaft carries a ball 13 in jaws 14, so that the end of the shaft may ride upon the cam 15 readily, in the course of the revolution of the support and the ejector bodily with the rotating table 1.

The bottom 4 of the rotating support is provided with a sleeve 16, through which the rod 11 passes. This sleeve turns in a bearing 17, which is formed of a downwardly projecting collar from the bottom of the rotating table 1. Below this sleeve, and mounted upon 16, is a pulley 18 attached to 16 by a set-screw 19. This pulley is adapted to be engaged by the moving belt 20, through which agency the support is rotated.

Within the hub of the pulley, and surrounding the ejecting shaft 11, is the helical spring 21, which engages at its lower end with the cross-pin 22, carried by the shaft 11, and at its upper end with the sleeve 16, thus securing a constant downward pressure on the shaft 11, to keep the ball 13 in engagement with the surface of the stationary table 23 or the cam 15 carried by the stationary table.

The stationary table 23 is supported on legs 24. This table supports the rotating table 1, the paraffin tank 25, and the mechanism for actuating the paraffin tank control, the mechanism for moving the rotating table, and the mechanism for rotating the supports 2.

Turning to the mechanism for rotating the rotating table 1, there is provided a pulley 26, which is fastened to the shaft 27, and a loose pulley 28. Pulley 26 is driven from any suitable source of power by a belt. On the inner end of the shaft 27 is a second gear 29, which is connected to a gear 30, mounted on a shaft 31. This shaft has at its extreme end a crank 32 and a crank-arm 33. This crank-arm 33 is connected by a cross-arm 34 to a reciprocating rod 35 carried in the guides 36, which guides are mounted beneath the stationary table 23. The forward and free end of the reciprocating rod 35 carries a head 37 and a spring 38. Pivoted upon the head is a pawl 39, which is pressed into engagement with a ratchet 40 by the spring 38, so that as 35 reciprocates it moves the ratchet 40 one step. The ratchet 40 is connected to a shaft 41 by a pin 42. This shaft is journaled in a depending collar 43, carried by the stationary table 23. Mounted on the shaft is the rotating table 1. This rotating table 1 is strengthened by a plurality of ribs 44, radiating from the center of the table. Thus the rotating table is moved forward step by step. Mounted on the reciprocating rod 35 is a block 45, having a cam 46 for engagement with a plunger 47. This plunger is carried in a depending bracket 48 in the bottom of the stationary table 23. It is limited in its downward movement by a cross-pin 49.

The upper end of the pin is guided in the aperture 50 in the table 23, and projects above that table until it comes in contact with the free arm 51 of a locking pawl, which is pivoted at 52 upon a bracket or support 53, mounted on the surface of the table 23. The other end of this locking pawl is designated 54, and is provided with a hook 55, which engages with the rotating table 1 on the under-side thereof, and is moved into such a position by the helical spring 56. The free end of the hook 55 engages with a block 57. These blocks are spaced from one another, and are so arranged that the table moves two steps before it is brought to rest by the engagement of 55 with the block 57. Upon the third stroke, 55 is released, and the two steps are repeated. It will be understood that this step by step mechanism may be varied to suit varying conditions.

As this rotation of the table 1 and its supports 2 takes place, the pulleys on the supports, which are designated 18, come in contact with the belt 20. This belt passes over the pulleys 58, 59, and 60. The belt engages with those pulleys which are carrying the cans or tops that are having the paraffin applied to them, that are being dried, and those which are carrying the cans that are being cooled. When these operations are completed, there is no necessity for rotating the supports.

The pulley 58, which is the main driving pulley for rotating the belt 20, is driven off of the shaft 27 by a gear 61 and a gear 62, which latter gear is mounted on a shaft 63, which is carried vertically in the table 23.

Turning to the apparatus for applying the sealing medium, such as wax or paraffin, I provide a water-jacketed tank 25, which is heated by the burner 64. I also provide supplementary burners 65, which apply a small flame directly beneath the spouts 66, which convey the heated paraffin from the tank to the top of the rotating caps or can bodies. The purpose of having these supplementary burners is to keep the paraffin hot and fluid in the restricted area of the spout, where it might become chilled and clog the free movement of the sealing medium from the tank.

To control this application of the paraffin, I provide the following apparatus:

The shaft 31 has mounted thereon a cam 67, with a high point 68 thereon. A depending member 69 is pivotally supported on the bracket 70, beneath the table 23. This swinging member 69 is adapted to swing in the path of either the low point or the high point of this cam laterally. It is drawn against the cam by the spring 71, which is attached to the lower end of 69 at one end, and to the supporting table at the other end. When the swinging member 69 is brought in the path of the high point of the cam, it is actuated back and forth, carrying with it the link 72, the bell-crank 73, which is pivoted beneath the table 23, and the actuating rack 74, which carries the teeth 75. These teeth engage with a gear 76, mounted on a shaft 77, which controls the paraffin valves 78 and 79 in the spouts 66, allowing the paraffin to escape intermittently, due to the effect of gravity.

It will be understood that an ejecting pump may be substituted for this gravity feed.

This intermittent feeding of the paraffin may be rendered inoperative by the following means:

A food treadle 80 is provided, connected to one of the legs 24 of the table. This treadle is connected to a treadle rod 81 which is maintained in its inoperative position by the spring 82, to which it is connected. At the upper end of the rod 82 is a bell-crank 83 connected to a transverse rod 84, which is suspended on brackets 85 beneath the stationary table 23. At the forward end of this transverse rod 84 is a second bell-crank 86, connected to a link 87, which in turn is connected to the swinging member 69 by a pin 89. When the pedal is depressed, the swinging member 69 is brought opposite the low point on the cam 67, and thus rendered inoperative.

When the paraffin is applied to the rapidly revolving can tops on the interior as at 90, due to the fact that the can top is revolving rapidly with the support 2, I provide certain stationary guards 91, which are supports for the cans while they are being carried to the chute, and also act as sweeps.

After the paraffin has been applied, in order to rapidly cool it I provide a plurality of air nozzles 92, fed from a main pipe 93, which in turn communicates with a trunk line 94. This trunk line receives its supply of air from a fan 95, driven by an electric motor 96, supported beneath the stationary table 23.

After the paraffin has been cooled, and about the time the supports, which have now become stationary, approach the delivery chute, the ball 13 comes in contact with the cam 15, thus elevating the shaft 11, which in turn carries with it the ejecting plate 9, moving the can body 3 into a position where it can be picked up by the chute 97, which just clears the top of the plate 9. Due to the fact that the cap or can body 3 is moving, it is shoved upon the delivery chute 97, between the walls 98, and carried away from the machine.

It will be seen that it is necessary to move the machine a suitable number of steps to bring the rotating supports with the can bodies directly beneath the paraffin spouts, and hold them in such a position while the can bodies are rotated and the paraffin is applied, whereupon a new set of can bodies is brought into position.

In order to insure the perfect stopping at the exact location of the rotating table, and the holding of the table in that position a predetermined time, with the perfect release of the table at the proper moment, I provide a brake, which is intermittently applied.

The table is provided with a drum 99, which engages with a brake band 100, carried on a brake band support 101, which is positioned and adjusted by the set-screws 102. Thus the table is always moved against the resistance of these brake bands, with the consequence that as soon as the power is released the table will promptly come to rest, and not overrun its next position.

*Method of operation.*—The operator places the can bodies to which the sealing medium is to be applied, upon the supports, which are being moved bodily on the table 1, but which are not rotating, the operator standing at the position marked A. The table is moved the space of two supports, so that two can bodies are treated simultaneously. It will be understood that this may be varied to suit the desire of the operator. As soon as the supports 2 come beneath the spouts to apply the paraffin, they are rotated by the belt 20, the paraffin spouts are opened, the paraffin applied, the paraffin shut off, and the table moved two steps. The rotating can bodies continue to be rotated by the belt 20, so that the centrifugal force keeps the fluid paraffin in the proper position on the can body while it is hardening. While still rotating these can bodies are brought beneath the air spouts and chilled by the blasts of air, and are then finally elevated by the ejection apparatus and removed by the delivery chute.

The machine is so timed that when the table is at rest, the paraffin supply is opened, and just prior to its being moved the paraffin supply is shut off.

It will be apparent that my method and machine should not be fairly limited to a rotating table nor to revolving supports for the can bodies being sealed, but I desire to comprehend within my invention suitable modifications and adaptations of it. In particular, I comprehend the use of an endless carrier, or the moving of the supply of paraffin relative to the cans and their supports.

Having thus fully described my invention, what I claim as new, and desire to secure by Letters Patent, is:

1. In a can-sealing machine, a rotary table, a plurality of supports mounted on the periphery thereof, a tank containing the sealing medium, spouts on said tank having their mouths adjacent the top of the supports on the rotary table, said tops being adapted to hold in position can bodies to be sealed, a supporting table for supporting the rotary table, the sealing medium tank, and the operating mechanism, means connected to each of said supports to rotate it, means connected to each of said supports to eject the can body therefrom, means to move said rotary table step by step, means to permit of the delivery of the sealing medium on the rotary table as at rest, and to cut off the sealing medium before the rotary table moves to a new position.

2. In a can-sealing machine, a rotary table, a plurality of supports mounted on the periphery thereof, a tank containing the sealing medium, spouts on said tank having their mouths adjacent the top of the supports on the rotary table, said tops being adapted to hold in position can bodies to be sealed, a supporting table for supporting the rotary table, the sealing medium tank, and the operating mechanism, means connected to each of said supports to rotate it, means connected to each of said supports to eject the can body therefrom, means to move said rotary table step by step, means to permit of the delivery of the sealing medium on the rotary table as at rest, and to cut off the sealing medium before the rotary table moves to a new position, and means for rotating said supports.

3. In a can-sealing machine, a rotary table, a plurality of supports mounted on the periphery thereof, a tank containing the sealing medium, spouts on said tank having their mouths adjacent the top of the supports on the rotary table, said tops being adapted to hold in position can bodies to be sealed, a supporting table for supporting the rotary table, the sealing medium tank, and the operating mechanism, means connected to each of said supports to rotate it, means connected to each of said supports to eject the can body therefrom, means to move said rotary table step by step, means to permit of the delivery of the sealing medium on the rotary table as at rest, and to cut off the sealing medium before the rotary table moves to a new position, means for rotating said supports, and means for cooling said cans after the sealing medium has been applied thereto.

4. In a can-sealing machine, a rotary table, a plurality of supports mounted on the periphery thereof, a tank containing the sealing medium, spouts on said tank having their mouths adjacent the top of the supports on the rotary table, said tops being adapted to hold in position can bodies to be sealed, a supporting table for supporting the rotary table, the sealing medium tank, and the operating mechanism, means connected to each of said supports to rotate it, means connected to each of said supports to eject the can body therefrom, means to move said rotary table step by step, means to permit of the delivery of the sealing medium on the rotary table as at rest, and to cut off the sealing medium before the rotary table moves to a new position, means for rotating said supports, means for cooling said cans after the sealing medium has been applied thereto, and means for engaging with the cans when they are elevated by the ejecting mechanism to convey them away from the rotary table.

5. In a can-sealing machine, a supporting table, a rotary table, means to move said rotary table step by step, means to lock said rotary table in position, braking means to regulate the movement of said table, a supply of a sealing medium, means for controlling said supply to synchronize with the movement of the table, whereby the supply will be released only when the table is stationary, a plurality of supports for can bodies arranged on the periphery of said table, adapted to bring the can bodies beneath the supply of the sealing medium, means for rotating said supports, means within said supports for ejecting the can, a cam on said stationary supporting table for engaging with the ejecting means at a predetermined point, and means on the stationary table for engaging with the supports to rotate them during certain portions of their movement with the rotary table.

6. In a can-sealing machine, a rotary table, a rotary support journaled therein, a pulley on the base of said support for rotating it, a cup-shaped cap on the top of said support for supporting a can body, an ejecting plate within said cup for ejecting the can body which rests thereon, a rod connected to said plate, yielding means for maintaining said plate and rod in operative position, a stationary table, and a cam thereon, said cam being adapted to engage with the bottom of the rod, compressing said yielding means and ejecting the can body.

7. In a can sealing machine, a can conveyor, means for driving said conveyor, sealing medium applying means, a valve controlling the supply from said sealing medium applying means, a connection between said valve and said conveyor driving means whereby the valve is both positively opened and positively closed by movement of said conveyor driving means, and means for shifting portions of said connection to render the conveyor driving means inoperative to control said valve.

8. In a can sealing machine, a conveyor, a can support carried by and rotatable with respect to said conveyor, said cam support being in the form of a cup member within which a can is adapted to be held while sealing material is being applied thereto, and a plunger within said cup member operable by movement of said conveyor to eject the can from said support.

9. In a can sealing machine, a conveyor, a support on said conveyor for holding a can while sealing material is being applied thereto, said support being rotatable with respect to said conveyor whereby the sealing material is applied to different portions of the can, and means rotatable with and longitudinally movable relative to said support for ejecting the can therefrom.

In testimony whereof, I affix my signature.

JOHN R. KLIN.